(12) United States Patent
Rani et al.

(10) Patent No.: US 10,430,745 B2
(45) Date of Patent: Oct. 1, 2019

(54) METHOD AND APPARATUS FOR EVALUATING DRIVER PERFORMANCE AND DETERMINING DRIVER REWARDS

(71) Applicant: AZUGA, INC., San Jose, CA (US)

(72) Inventors: Ananth Rani, Fremont, CA (US); Ashwin Sabapathy, Bangalore (IN); Mahesh Kumar, Bangalore (IN); Akash Sharma, Bangalore (IN)

(73) Assignee: Azuga, Inc., San Jose, CA (US)

( * ) Notice: Subject to any disclaimer, the term of this patent is extended or adjusted under 35 U.S.C. 154(b) by 213 days.

(21) Appl. No.: 15/585,790

(22) Filed: May 3, 2017

(65) Prior Publication Data

US 2017/0323244 A1 Nov. 9, 2017

Related U.S. Application Data

(60) Provisional application No. 62/331,129, filed on May 3, 2016.

(51) Int. Cl.
| | |
|---|---|
| *G06Q 10/06* | (2012.01) |
| *G06Q 50/06* | (2012.01) |
| *G07C 5/00* | (2006.01) |
| *G07C 5/02* | (2006.01) |
| *G07C 5/08* | (2006.01) |

(52) U.S. Cl.
CPC . *G06Q 10/06398* (2013.01); *G06Q 10/06393* (2013.01); *G06Q 50/06* (2013.01); *G07C 5/008* (2013.01); *G07C 5/02* (2013.01); *G07C 5/0841* (2013.01)

(58) Field of Classification Search
CPC ....... G06Q 10/06398; G06Q 10/06393; G06Q 50/06; G07C 5/008; G07C 5/02; G07C 5/0841

See application file for complete search history.

(56) References Cited

U.S. PATENT DOCUMENTS

| | | | | |
|---|---|---|---|---|
| 8,996,234 | B1* | 3/2015 | Tamari | G07C 5/0808 701/29.3 |
| 9,424,751 | B2* | 8/2016 | Hodges | G07C 5/008 |
| 9,728,015 | B2* | 8/2017 | Kwak | G07C 5/0808 |
| 2008/0243558 | A1* | 10/2008 | Gupte | G06Q 40/08 705/4 |
| 2010/0030582 | A1* | 2/2010 | Rippel | G06Q 10/10 705/4 |
| 2011/0196571 | A1* | 8/2011 | Foladare | G01S 5/0027 701/31.4 |

(Continued)

FOREIGN PATENT DOCUMENTS

WO WO-2015061077 4/2015

OTHER PUBLICATIONS

International Search Report and Written Opinion dated Jul. 20, 2017 for Application No. PCT/US2017/030846, 12 pages.

*Primary Examiner* — Sujay Koneru
(74) *Attorney, Agent, or Firm* — Moser Taboada

(57) ABSTRACT

The present invention is directed towards a method for evaluating driver performance. In exemplary embodiments, the method comprises receiving driver activity associated with a driver of a vehicle in a fleet, determining a driver score based on predetermined criteria and generating and updating a driver profile based on the driver activity and evaluating the driver score to generate rewards for the driver and updating the driver profile accordingly.

17 Claims, 13 Drawing Sheets

(56) References Cited

U.S. PATENT DOCUMENTS

| | | | |
|---|---|---|---|
| 2014/0113619 A1* | 4/2014 | Tibbitts | G07C 5/008 455/419 |
| 2014/0195272 A1* | 7/2014 | Sadiq | G06Q 40/08 705/4 |
| 2014/0226010 A1* | 8/2014 | Molin | G06Q 10/06 348/148 |
| 2014/0266660 A1* | 9/2014 | Slaton | B60K 31/00 340/439 |
| 2014/0358356 A1* | 12/2014 | Jones | G07C 5/0866 701/31.4 |
| 2015/0199630 A1* | 7/2015 | Pfeiffer | G06Q 10/0639 707/722 |
| 2016/0039426 A1* | 2/2016 | Ricci | H04W 4/21 701/1 |
| 2016/0086397 A1* | 3/2016 | Phillips | G07C 5/0808 701/32.4 |
| 2017/0061825 A1* | 3/2017 | Payne | G09B 19/167 |

* cited by examiner

US 10,430,745 B2

METHOD AND APPARATUS FOR EVALUATING DRIVER PERFORMANCE AND DETERMINING DRIVER REWARDS

CROSS-REFERENCE TO RELATED APPLICATION

This application claims benefit of U.S. Provisional Patent Application No. 62/331,129 filed May 3, 2016, which is hereby incorporated in its entirety.

BACKGROUND

Field

Embodiments of the present invention generally relate to metrics associated with fleet management, and, more particularly towards a method and apparatus for evaluating driver performance, determining behavioral targets and driver rewards to improve driver performance.

Description of the Related Art

Increasingly, corporate entities are looking for ways to evaluate their employees in a positive and supportive way in contrast to targeting poor performance of employees via punitive measures. However, manual evaluations are costly, take an excessive amount of managerial time, and are sometimes inaccurate in their summary of an employee. Further, managers might not have a full data set related to the function of the employee to evaluate them properly. Particularly in fleet operations, drivers don't always return to the office so engagement of the driver with management is poor and managing driver retention is difficult.

In the context of a fleet of vehicles, to provide a more complete data set to fleet managers, telematics modules into each vehicle to track a multitude of data points related to the driver and the vehicle. Most often these telematics modules are used for navigation and tracking of the vehicles in the fleet. However, the data from the telematics modules has not been applied to evaluate driver performance, and further, to provide positive rewards to improve the driver's performance of his or her job according to their driving ability. Particularly, the modus of motivation must be positive for the driver, the employer and the community in which they drive.

Therefore, there is a need in the art for a method and apparatus for evaluating driver performance and determining driver rewards.

SUMMARY

The present invention is directed towards a method for evaluating driver performance. In exemplary embodiments, the method comprises receiving driver activity associated with a driver of a vehicle in a fleet of vehicles from a telematics module installed in the vehicle, analyzing the driver activity based on predetermined criteria to evaluate driver performance, generating a driver score based on the driver performance (safe driving, fuel economy and productivity), generating rankings among drivers of the fleet of vehicles based each individual driver score and generating rewards for the driver according to their rank within the rankings or for improving driver performance.

Other and further embodiments of the present disclosure are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
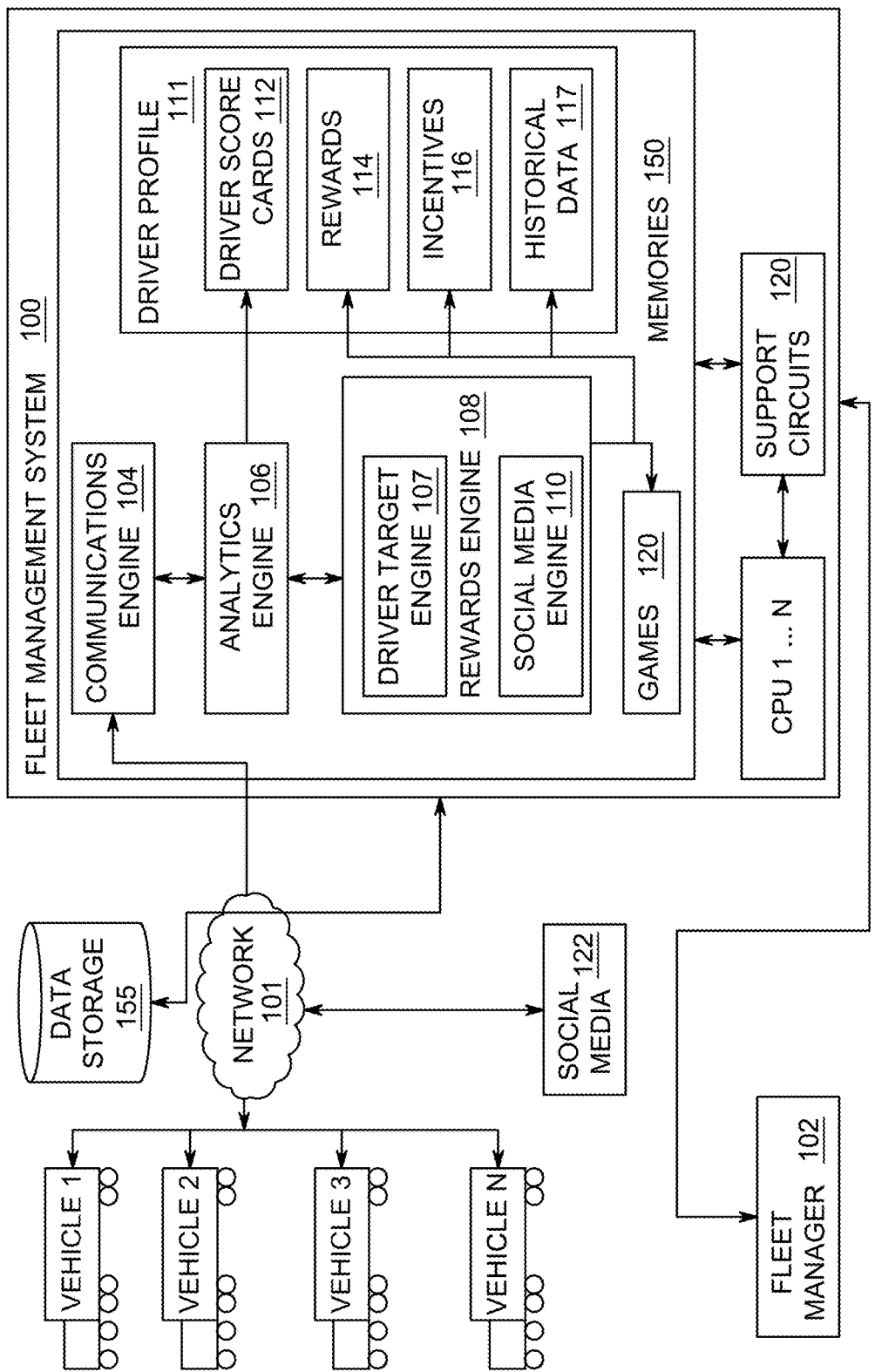
FIG. 1 illustrates a system for evaluating driver performance in a fleet of vehicles in accordance with exemplary embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and apparatus for evaluating driver performance, determining driver-specific behavioral targets for improving performance and a mechanism to reward drivers. In one embodiment, vehicles in a fleet of vehicles are each fitted with a telematics module which monitors and logs information related to how the vehicle is driven. This information is generally provided to a fleet management system which incorporates an analytics engine that is configured to generate a driver profile for each driver of the vehicles. A fleet manager oversees the vehicle fleet and provides criteria upon which driver performance is evaluated. The driver evaluation is stored, in one embodiment, as a driver score in the driver profile. Driver scores are based on safety (braking, acceleration, speeding, cornering, distracted driving), fuel economy and productivity. All parties benefit when drivers are motivated to compete on these dimensions: safer driving reduces risk for the driver personally and for the community while reducing liabilities for the employer; improved driver productivity increases business margins and fuel economy lowers operational costs for the employer. Reducing fuel consumption also benefits by reducing carbon emissions. The driver is algorithmically compared to other drivers in the vehicle fleet to generate a driver ranking and rewards and incentives are generated for each driver according to their rank in order to achieve these goals.

FIG. 1 illustrates a fleet management system 100 for evaluating driver performance in a fleet of vehicles in accordance with exemplary embodiments of the present invention.

The system 100 comprises a communications engine 104, an analytics engine 106 and a rewards engine 108. The rewards engine 108 further comprises a Driver Target engine 107 and a Social Media engine 110.

The fleet management system 100 is administered by a fleet manager 102. The fleet management system 100 is coupled to a fleet of vehicles, vehicle 1 to vehicle N across network 101, or via other communication means. Interaction with social media 122 is included via network 101. All data analyzed by the fleet management system 100 is stored in data storage 155. In some embodiments, data storage 155 is a relational database management system, while in other embodiments other data storage options are employed. Those of ordinary skill in the art will recognize that the present invention does not limit the type of data storage used.

According to an exemplary embodiment, each of the Vehicles 1 to N submits telematics data to the fleet management system 100 via network 101. In some embodiments, telematics data is received at the system 100 from other sources as well, including on-board devices, mobile devices carried by drivers, other geo-location devices such as GPS devices, and the like. In some instances, the telematics data is extracted from the vehicles forcibly by the communications engine 104 of the fleet management system 100 and in other instances, the data is transmitted from the vehicles to the communications engine 104. The communications engine 104 monitors reception of the telematics data and organizes the data according to, at least, vehicle and driver, so that even if a driver were to use a different vehicle, the driver's performance can be stored as a unified entry. The communications engine 104 is also responsible for storing this data in data storage 155 and interacting with social media sites 122 and the fleet manager 102. The communications engine 104 is coupled to the analytics engine 106 and the rewards engine 108.

The analytics engine 106 is responsible for generating at least a portion of a driver profile 111 for each driver in the fleet. In an exemplary embodiment, the analytics engine 106 analyzes the telematics data on the driver and the vehicle provided by the communications engine 104. The data is parsed to determine a driver score by, for example, applying weights to each portion of the telematics data, which may include speeding events and duration of speeding, braking and acceleration events, GPS information, cell phone usage, fuel efficiency, stops, driving distance, jobs, and the like. In other embodiments, a specific formula is used to determine a driver score. In some embodiments, drivers may get scored on each of their various driving abilities separate, and/or there is an overall score. Each of these scores is stored in the driver profile 111 as driver score cards 112.

The analytics engine 106 is further coupled to the rewards engine 108. The rewards engine 108 determines rewards for the driver based on their driver profile 111, and in some embodiments, more specifically on their driver score cards 112. The analytics engine 106 compares the driver score cards 112 of each driver with other drives in the fleet and generates a ranking of the drivers. In some embodiments, there is an overall ranking, while in other embodiments there are additional rankings in various categories. In some embodiments, these categories comprise at least a safety ranking, a fuel efficiency ranking, a productivity ranking, in addition to other well-known metrics used for ranking employee performance. The rewards engine 108 activates the social media engine 110 which interacts with social media 122 to extract driver social information, for example, the driver's location and interests. The driver social information is used, along with the driver score cards 112 to determine appropriate and relevant rewards 114 for the user making the rewards sensitive to the driver's social information such as location, interest and the like. The drivers are rewarded according to the driver's rank in the rankings. In some embodiments, the rewards engine 108 also generates incentives 116 based on the driver's social information and the driver profile 111.

The Driver Target engine 107 consists of an algorithm to mine historical trip data for individual drivers to come up with generalizable driving patterns for each driver. These rules indicate the likelihood of the driver exhibiting certain behavior based on past driving patterns. Patterns of undesirable behavior, for example, over-speeding, braking, acceleration, idling, etc., would be used to develop specific and relevant targets for the driver to improve driver performance. The Driver Target engine 107 evaluates a driver's historical data 117 to determine whether there is a particular precedence of poor behavior according to time, zone, or the like. The Driver Target engine 107 then determines specific and relevant driving behavioral targets for individual drivers to improve driver performance. These targets would be linked to rewards/incentives for the driver to claim if the targeted behavior is met. This positive motivation helps improve their driver score by improving their driving habits.

The Driver Target engine 107 determines specific and relevant driving behavioral targets for individual drivers to improve driver performance, for example, proposing that a driver does not have any speeding events on a particular day that he is found to drive at high speeds based on past behavior. This target is coupled to the incentive that the driver could claim if the targeted behavior is satisfied at the end of the day. The social media engine 110 also interacts with social media 122 via network 101, and posts, according to the driver's permission, their driver profile 111 onto their profile page. Additionally, the rewards engine 108 may generate games 120 which interact with social media 122 that allow drivers of vehicles 1 to N engage in meta-games to improve their rankings or to compete with each other to obtain a better driver profile.

Each engine 104 to 110 is stored in memories 150, and their instructions and/or algorithms are executed by one or more CPUs 1 to N. Memories 150 represent one or more sets of independently linked memory units capable of intercommunication and store non-transient processor-executable instructions and/or data that may be executed by and/or used by the CPUS 1 to N. These processor-executable instructions may comprise firmware, software, and the like, or some combination thereof. The system 100 may be programmed with one or more operating systems (generally referred to as operating system (OS)), which may include OS/2, Java Virtual Machine, Linux, Solaris, Unix, HPUX, AIX, Windows, Windows 95, Windows 98, Windows NT, Windows 2000, Windows ME, Windows XP, Windows Server, and Windows 7+ among other known platforms. At least a portion of the operating system may be disposed in the memories 150. In an exemplary embodiment, the memories 150 may include one or more of the following: random access memory, read only memory, magneto-resistive read/write memory, optical read/write memory, cache memory, magnetic read/write memory, and the like, as well as signal-bearing media as described below. Those of ordinary skill in the art will recognize that some of the algorithms, engines and services described in this invention, including the processing of historical data, may incorporate the use of distributed computing (e.g., java, HADOOP and the like) on multiple nodes for processing.

The CPUS 1 to N are generally coupled to support circuits 152 to support input/output to external devices, or the like. Those of ordinary skill in the art will recognize that each individual engine may not be stored on a contiguous set of memory or executed on the same CPU, but that one or more engines may be implemented as their own service, communicating with other services via shared memory or other well-known means.

The CPUS 1 to N may include microprocessors known in the art, and/or dedicated function processors such as field programmable gate arrays programmed to perform dedicated processing functions. The support circuits 152 include microcontrollers, application specific integrated circuits (ASIC), cache, power supplies, clock circuits, data registers, I/O interface, and the like.

Those skilled in the art will appreciate that system 100 is merely illustrative and is not intended to limit the scope of embodiments. In particular, the system and devices may include any combination of hardware or software that can perform the indicated functions of various embodiments, including computers, network devices, Internet appliances, PDAs, wireless phones, pagers, and the like. System 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 2:
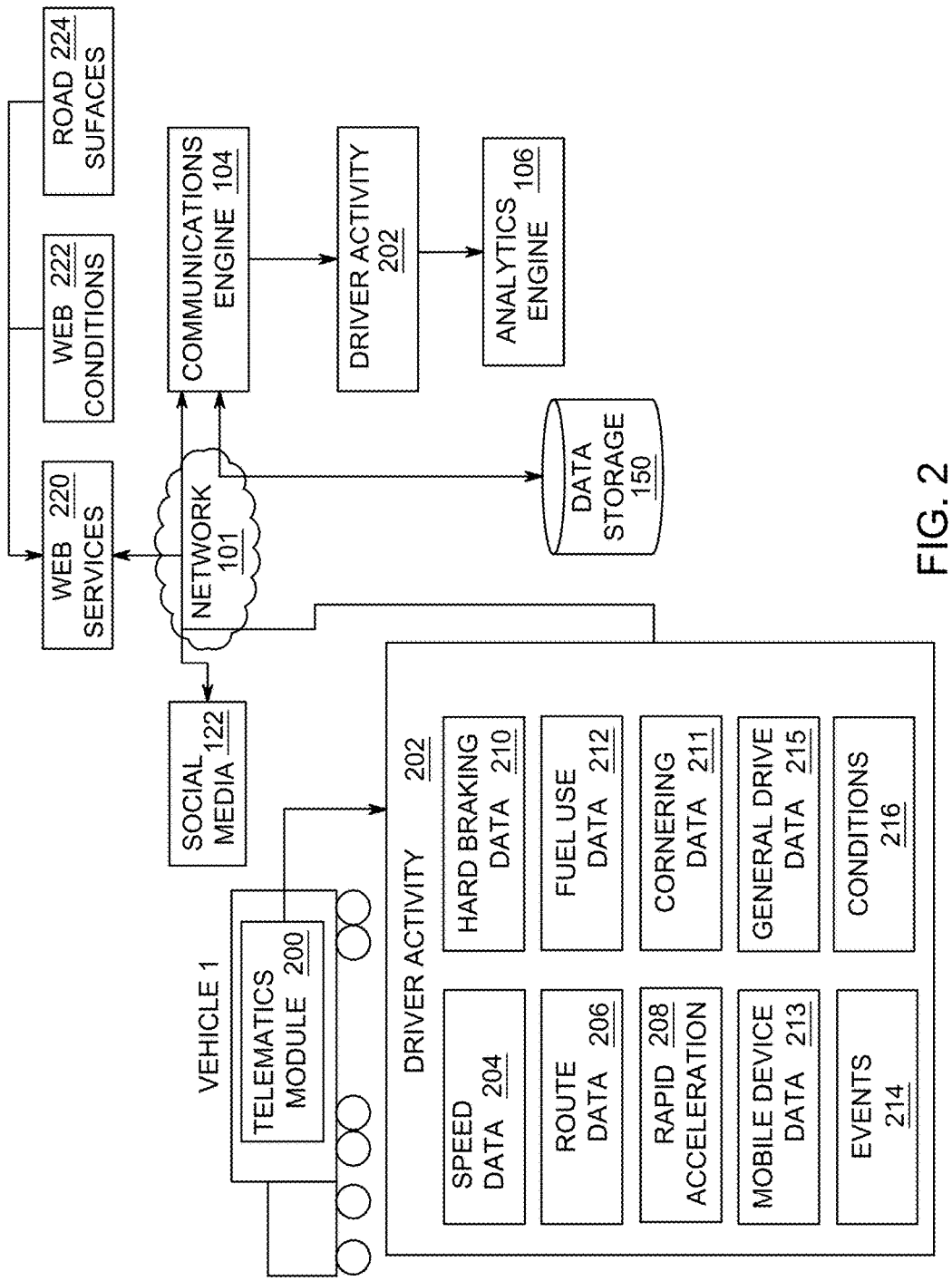
FIG. 2 illustrates a block diagram of the communications engine in accordance with exemplary embodiments of the present invention.

FIG. 2 illustrates a block diagram of the communications engine 104 in accordance with exemplary embodiments of the present invention. Vehicle 1 is shown comprising a telematics module 200. Those of ordinary skill in the art will recognize that generally, each vehicle in the fleet will have a telematics module installed therein, or other similar device for tracking movement and other data and metadata associated with the driver and the vehicle.

The telematics module 200 generates driver activity 202, which comprises speeding data 204, route (which includes geographic location) data 206, rapid accelerations 208, hard braking data 210, cornering data 211, fuel use data 212, mobile device data 213 (which includes, for example, cellphone usage while driving) along with general drive data 215 (e.g., driving distance, drive time, time periods, number and duration of stops, arrival and departure times at jobs, and the like). Other types of data may also be recorded and the telematics module 200 can be programmed accordingly such as particular events 214 related to the driver activity 202 and conditions 216 in which those events 214 occurred. Each trip that a driver takes has attributes that include: overall distance, the events carried out by the driver, spatio-temporal indices and weight of vehicle, among other things. In exemplary embodiments, the events 214 and conditions 216 relate to each of the data 204 to 212. For example, if the driver's speed passes a threshold level, an event would be recorded for the driver. The events 214 are also tied to conditions 216. For example, a trip that the driver takes may have them going through various urban, suburban, low-risk, high-risk zones and various weather conditions. When an event occurs, the conditions for that event are also recorded as conditions 216 and an eventual driver score is calculated according to the various events, conditions and their assigned weight.

The present invention does not limit the data to 204-216 and recognizes that other types of recordable data may be transmitted to the fleet management system 100. The driver activity 202 is communicated to the communications engine 104, which stores and retrieves the driver activity information in data storage 155. The communication engine 104 also acts as the hub for any social media connections, or connections to external other web services 220 used by the fleet management system 100 such as local and national weather conditions 222 and road surface information 224. Road surface information 224 may also be determined from the telematics module 200 equipped with accelerometers.

Figure 3:
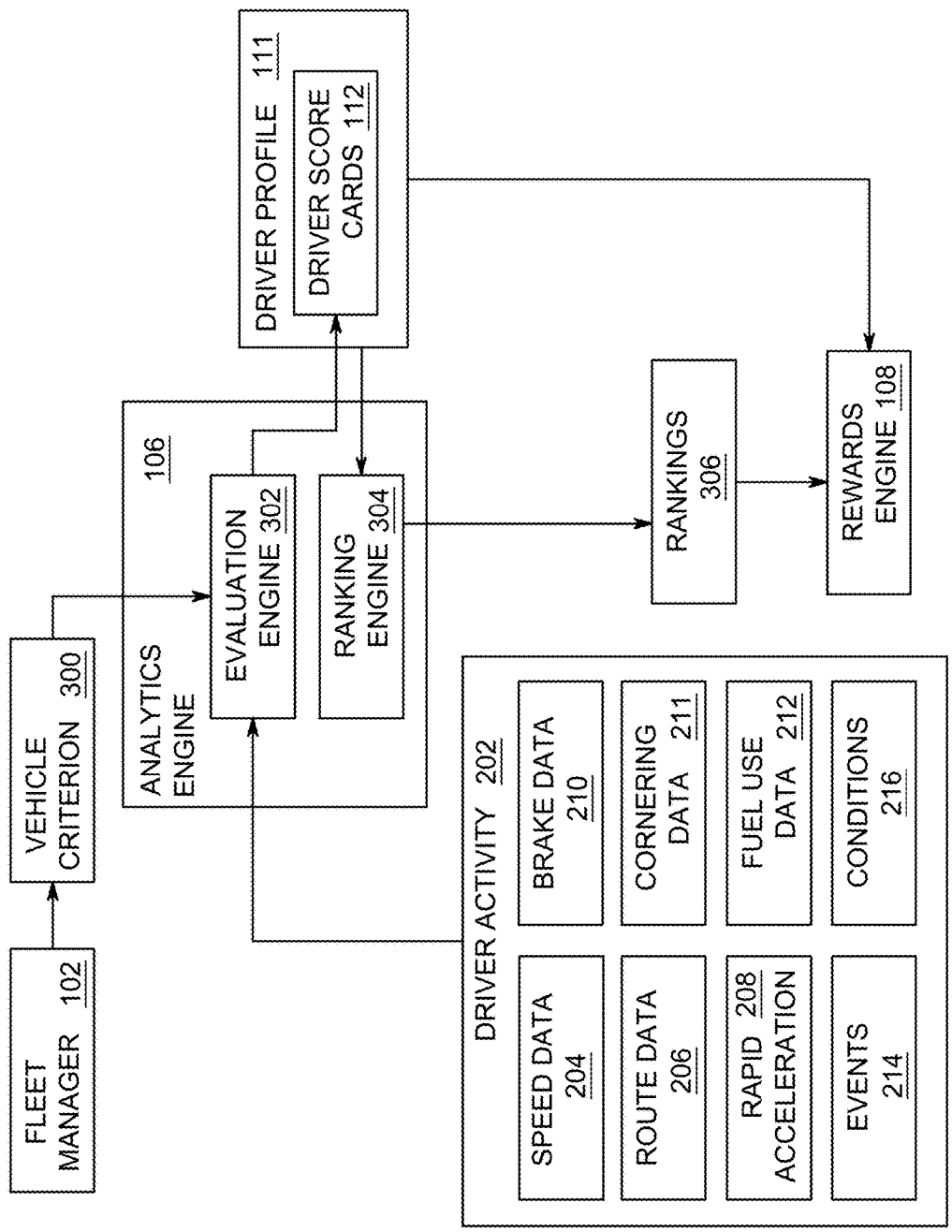
FIG. 3 illustrates a block diagram of the analytics engine in accordance with exemplary embodiments of the present invention.

FIG. 3 illustrates a block diagram of the analytics engine 106 in accordance with exemplary embodiments of the present invention. The analytics engine 106 comprises an evaluation engine 302 and a ranking engine 304. In some embodiments, the evaluation engine 302 analyzes the driver activity 202 to generate a plurality of driver score cards 112. These driver score cards 112 are stored in the driver profile 111. The driver score cards, as described above, each contain at least a score of the driver and a category of the score, relating to the user's proficiency in that category. Examples of categories include safety scores fuel economy scores and productivity scores, among others. In one embodiment, the driver score cards 112 are generated on a periodic basis according to a predetermined fleet policy that the fleet manager 102 can update. In other embodiments, the cards 112 are generated at will of the fleet manager 102 in order to evaluate driver performance on the fly.

The ranking engine 304 reviews the driver score cards 112 of all the drivers in the fleet and generates rankings 306, containing a ranking for each category contained in the cards 112. In some embodiments, there is an overall ranking of driver proficiency and several sub-rankings specific to particular categories of driver proficiency. The rankings are then coupled to the rewards engine 108.

In some embodiments, driver score cards 112 are evaluated by the evaluation engine 302 according to particular methodologies. The evaluation engine 302 evaluates each driver daily (an average of these daily scores is used to evaluate drivers over any time frame as required by an administrator). Individual scores are calculated for speeding, acceleration, braking, cornering, fuel use, driver productivity using the attributes of all trips that day. These individual scores are then summed together to form an overall score for a driver for a period (e.g., a day, week, month or the like). In some embodiments, each of the individual scores are weighted differently and then summed to form a total driver score in the range of zero to one hundred, where zero is the worst score and 100 is the best score.

For example, if a braking event is recorded, the evaluation engine 302 looks to the magnitude of the braking and assigns a lower score for events with larger magnitudes. Spatio-temporal indices also play a factor in the score of the event. Spatio-temporal indices include conditions under which event occurred such as weather, time of day (e.g., if the event has occurred during the time of day considered higher risk, the braking score is impacted more negatively), geographic location (e.g., certain zip codes are associated with a particular risk level, based on recorded accidents, crashes, and the like and events that occur in high risk location penalize the driver's score more than events that occur in low risk locations), weight of vehicle, for example a heavier vehicle carries a higher penalty for risky behavior than a lighter vehicle.

Each event is assigned a score determined by the magnitude, duration and spatio-temporal context. In other words, an event that occurred in clear conditions and/or low risk zone will have a better score than an event that occurred under wet or snowy conditions and/or a high risk zone.

In some embodiments, the event scores are combined by summing each individual event score together, in relation to miles a driver has driven: for example, number of events per hundred miles. The driver's individual scores are calibrated based on fleet average for a corresponding event from a number of years of historical data. In one example, an average number of events per unit distance is calculated, and an individual driver score is normalized by the evaluation engine 302 to relate the score to a score of about 70/100 for a typical driver. So, for example, if a driver has fewer than two events for a certain distance driven, the driver's score for a particular category will be above 70. The driver's acceleration score and cornering score are computed identically.

The driver's speeding score is computed similarly, however additional factors are taken into account. The evaluation engine 302 takes into account the duration of speeding, the magnitude of the speeding and the duration of exceedance in addition to what's considered in the acceleration and braking score. The telematics module 200 detects and notes when a driver has crossed a particular speed threshold and/or crossed a posted speed limit. In detail, the magnitude of the speeding event includes exceedance above a posted speed limit or a threshold speed. All of these factors in addition to the weather, location, time and the like are considered when the evaluation engine 302 formulates a normalized speeding score.

The driver's fuel economy score is determined from the percentage of his idling with respect to his total trip time during the recording period (e.g., one day). Anything above a threshold value (with some percentage allowance) reduces the driver's fuel economy score.

The driver's ultimate score in the score cards 112 also includes a productivity score which is calculated by the evaluation engine 302 according to 1) number of stops in a day, 2) miles per stop. In some embodiments, actual jobs are tracked when inputs on job schedules to be carried out by a driver are provided by the fleet manager (administrator) at the beginning of a day.

Ultimately, the drivers score cards 112 contains an overall driver score which is based on 1) Safety Score: (braking/acceleration/speeding, cornering and distracted driving), 2) Fuel Economy Score and 3) Productivity Score. Once the driver score is calculated, drivers may be ranked daily, weekly, and/or monthly on the score numerically. In some embodiments, the drivers score is averaged out during a period (e.g., a week, month or quarter) and then the ranking is performed by the ranking engine 304.

The Driver score is a composite score that the evaluation engine 302 determines that allows driver behavior to be described using a single measure so the drivers may be compared to each other and for the same driver to be compared across time. The driver score is calculated using 1) The safety score, 2) the fuel economy Score and 3) the driver productivity score. Each individual component of the driver score provides feedback to drivers and fleet managers to improve driving on measures that affect safety, fuel economy, and/or productivity.

A) Framework for the Safety Score

The driver score uses individual events of over-speeding, hard accelerations, hard braking, cornering and distracted driving, each event score capturing the magnitude of the event along with a spatio-temporal index representing the hazard conditions of the event.

1) Magnitude

The magnitude of each event is given a value based on the categorization of the event as given below. Those of ordinary skill in the art will recognize that the invention is not limited by the ranges presented below, but that these ranges can be modified according to administrator or manager preference to suit their needs. For example, the magnitude of a speeding event can be set by an afleet manager 102 or other administrator of system 100 as follows:

1.0=State speed limit exceeded by 9-16 km/hr
1.5=State speed limit exceeded by 17-24 km/hr
2.0=State speed limit exceeded by 25-32 km/hr
2.5=State speed limit exceeded by 33-40 km/hr
3.0=State speed limit exceeded by>40 km/hr In some embodiments, speeding alerts set by an administrator are used to compare that particular event's average speed with the maximum posted speed limit of the state to assign the exceedance category, though other equivalent methods are contemplated also. In some embodiments, the exceedance category is determined with respect to a posted speed limit for a particular stretch of road.

Other exemplary magnitude determinations are shown below:

Magnitude of an Acceleration Event
1.0=Acceleration between 13-16 km/hr/s
1.5=Acceleration between 17-20 km/hr/s
2.0=Acceleration>20.0 km/hr/s
Magnitude of a Braking Event
1.0=Braking between 13-16 km/hr/s (Hard Braking)
2.0=Braking>16 km/hr/s (Hard Core Braking)
Magnitude of a Cornering Event
1.0=Cornering with lateral g-force between 0.35 and 0.45 g
2.0=Cornering with lateral g-force>0.45 g
Magnitude of a Distracted Driving Event The magnitude of a distracted driving event is the total duration of cell phone use during driving recorded for that event (call made, call received, SMS sent). At present the duration is set at a default value (e.g., 120 seconds) but may be modified by an administrator or a fleet manager.

2) Spatio-temporal Index (STI)

Each event (speeding, hard acceleration, braking or cornering) for a particular driver is assigned an event score using the magnitude described above, along with a spatio-temporal index (STI) associated with the event. Adding the STI for the event indicates whether the event occurred under conditions of higher risk such as during rain, or a particular time of day, and adds a weight that factors in the conditions (e.g., location), occupancy of vehicle (where more than one occupant is exposed to risk), seat-belt usage (risk is increased when not using seat-belts), time (high, moderate and low risk hours as determined by historic crash data) and weather.

The STI for the driver score includes binary and categorical characteristics of a particular road environment for a particular point in time. Examples of some of these parameters are:

ST_Time: Low-risk (3 am-6 am, 9 am-3 pm, 6 pm-12 am)=1, Moderate risk (6 am-9 am, 3 pm-6 pm)=1.5, High risk (12 am-3 am)=3.0

ST_Weather: Rain/Snow/Poor visibility=2, Good conditions=1

STI_Area: Zip-code based risk (Based on historic crash rates in each zip code using available literature)

ST_Occupancy: Driver only=1, Other passenger=2 (Based on seat-belt use alerts from the device)

ST_Seat-belt use: Yes=1, No=2

The STI is computed by the evaluation engine 302 by adding all of the STI components to arrive at a single index for that event:

$$STI = ST\_Area + ST\_Occupancy + ST\_Seat\text{-}belt\ use + ST\_Time + ST\_Weather \quad \text{eq. (1)}$$

3) Event Score

Each event is scored using the magnitude of the event and the STI. Separate event scores for speeding, acceleration and braking are computed for each driver for each day.

$$Event\ Score_{Speeding} = Exceedance\ category_{Speeding} * Duration\ of\ Speeding(in\ minutes) * STI \quad \text{eq. (2a)}$$

$$Event\ Score_{Braking} = Magnitude\ of\ event_{Braking} * STI \quad \text{eq. (2b)}$$

$$Event\ Score_{Acceleration} = Magnitude\ of\ event_{Acceleration} * STI \quad \text{eq. (2c)}$$

$$Event\ Score_{Cornering} = Magnitude\ of\ event_{Cornering} * STI \quad \text{eq. (2d)}$$

$$Event\ Score_{Distracted\ driving} = Magnitude\ of\ event_{Distracted\ driving} * STI \quad \text{eq. (2e)}$$

4) Aggregated Event Scores

The Sum of Event Scores (SES) for a particular driver over a 1-day period per kilometer of Vehicle Kilometers Traveled (VKT) is, according to one embodiment, a raw score of that particular driving component behavior (speeding, braking, acceleration and cornering). Generally, VKT refers to kilometers traveled by the driver daily, or a daily maximum for the entire fleet. The SES is a measure of the frequency and magnitude of the events. According to some embodiments, vehicle (curb) weight as a proxy for vehicle class is also considered in scoring. For vehicles that weigh, for example, 1000 pounds above the average vehicle weight of 3500 pounds, a factor of (for example) 1.5 will apply to take into account increase in external fatality risk. A scale factor has been applied to each of the behaviors in order to calibrate the final sum of event scores.

$$SES_{Speeding} = Vehicle\ weight \times ScaleFactor_{Speed} \times \Sigma Event\ Scores_{Speeding} / VKT_{Day} \quad \text{eq. (3a)}$$

$$SES_{Braking} = Vehicle\ weight \times ScaleFactor_{Braking} \times \Sigma EventScores_{Braking} / VKT_{Day} \quad \text{eq. (3b)}$$

$$SES_{Acceleration} = Vehicle\ weight \times ScaleFactor_{Acceleration} \times \Sigma EventScores_{Acceleration} / VKT_{Day} \quad \text{eq. (3c)}$$

$$SES_{Cornering} = Vehicle\ weight \times ScaleFactor_{Cornering} \times \Sigma EventScores_{Cornering} / VKT_{Day} \quad \text{eq. (3d)}$$

$$SES_{Distracted\ driving} = Vehicle\ weight \times ScaleFactor_{DistractedDriving} \times \Sigma EventScores_{Distracted\ driving} / VKT_{Day} \quad \text{eq. (3e)}$$

5) Safety Behavior Scores

The SES for each of the Behavior components are converted to absolute scores through an inverse exponential function in order to bound the limits of the SES to a number between 0 and 100. The distributions of the speeding, braking, acceleration and idling components are exponentially distributed. However, other similar functions could be used in the future as more analysis is carried out. This Absolute Score is adjusted for VKT based on the distance driven and is relative to the Fleet/group of drivers.

$$SpeedingScoreWRT\ Fleet = e^{-SES_{Speeding\_WRT\ Fleet}} \times 100 - 10 \times (1 - VKT_{Driver} / VKT_{Daily\ max\ Fleet}) \quad \text{eq. (4a)}$$

$$\text{SpeedingScoreWRT Fleet} = e^{-SESAcceleration\_WRT\ Fleet} \times$$
$$100-10\times(1-\text{VKTDriver/VKTDaily max Fleet}) \quad \text{eq. (4b)}$$

$$\text{SpeedingScoreWRT Fleet} = e^{-SESBraking\_WRT\ Fleet} \times$$
$$100-10\times(1-\text{VKTDriver/VKTDaily max Fleet}) \quad \text{eq. (4c)}$$

$$\text{SpeedingScoreWRT Fleet} = e^{-SESCornering\_WRT\ Fleet} \times$$
$$100-10\times(1-\text{VKTDriver/VKTDaily max Fleet}) \quad \text{eq. (4d)}$$

$$\text{SpeedingScoreWRT Fleet} = e^{-SESDistracted\_WRT\ Fleet} \times$$
$$100-10\times(1-\text{VKTDriver/VKTDaily max Fleet}) \quad \text{eq. (4e)}$$

6) Safety Score

Individual weights for speeding (weight of 0.2), braking (weight of 0.3), acceleration (weight of 0.1), cornering (weight of 0.1) and distracted driving (weight of 0.3) are used along with the individual driving component scores to arrive at the "Safety Score" (eq 5a below) with respect to the Fleet.

The default weights for the entire population of drivers would be as assigned by the system 100 to enable comparisons of Safety Scores across the driver population. However, in some embodiments, these weights can be modified by the fleet manager for his vehicles based on the importance placed on an individual parameter (for example, the manager might assign a higher weight to idling due to cost considerations).

$$\text{SafetyScoreWRT Fleet} = 0.2\times\text{SpeedingScoreWRT Fleet} + 0.3\times\text{BrakingScoreWRT Fleet} + 0.1\times\text{AccelerationScore WRT Fleet} + 0.1\times\text{CorneringScore WRT Fleet} + 0.3\times\text{Distracted DrivingScoreWRT Fleet} \quad \text{eq. (5a)}$$

Those of ordinary skill in the art will understand that these weights are adjustable according to preference and not limited herein.

The Fuel Economy Score uses the magnitude of idling as a core component of the score. The Sum of Event Scores (SES) for idling is the percentage of idle time to trip time over a 1-day period above 10%. This 10% represents idle time at signal lights and other necessary stops.

$$\text{SESIdling} = \text{Scale factorIdling} \times ((\Sigma\text{IdletimeIdling}/\Sigma\text{Trip timeDay}) - 0.1) \quad \text{eq. (6a)}$$

The Fuel Economy score for a driver is computed as:

$$\text{Fuel Economy ScoreWRT Fleet} = e^{-SESIdling\_WRT\ Fleet} \times 100-10\times(1-\text{VKTDriver/VKTDaily max Fleet}) \quad \text{eq. (6b)}$$

In some embodiments, the fuel economy score takes into account the expected fuel economy of the vehicle driven at a particular average trip speed and the actual fuel economy of a trip. By mining through historic trip data, trips for a particular vehicle make-model-year have been grouped by region and season. These trips include only those trips with no events that affect fuel economy, i.e., only trips with no speeding, braking, acceleration and cornering events and with total idling less than 10%. The fuel economy for all trips with the same average trip speed is averaged and a dataset for a particular make-model-year in a particular region and season is prepared. This dataset is modelled using a polynomial regression function with fuel economy being predicted as a function of average trip speed. This equation is used to determine the expected fuel economy for that vehicle make-model-year for a particular region and season. At the end of a vehicular trip made in a particular region and season, the actual fuel economy is compared to the expected fuel economy and based on the driving behavior during the trip (speeding, braking and acceleration events), a fuel economy score is arrived at by the evaluation engine 302.

B) Framework for the Productivity Score

Two metrics are used by the evaluation engine 302 to arrive at a Productivity Score for a driver: a) average stops per hour during the day and b) average miles per stop. Average stops per hour during the day acts as a surrogate for the average number of jobs carried out by the driver in an hour and is given by:

$$\text{AvgStopsPerHour} = \text{Total number of stops per day}/$$
$$\text{Number of hours between the first trip start}$$
$$\text{time and last trip end time of the day} \quad \text{(eq. 7a)}$$

Average miles per stop is given by the following equation $$\text{AvgMilesPerStop} = \text{Total number of miles driven during the day}/\text{Total number of stops per day} \quad \text{(eq. 7b)}$$

Each of the two metrics is weighted by the inverse of the maximum value for that metric in the fleet during that day. These are then combined to arrive at the Productivity score for a driver as follows:

$$\text{Productivity scoreWRT FLEET} = 0.7\times(\text{AvgStopsPerHourDriver}/\text{AvgStopsPerHourDailyMaxFleet}) + 0.3\times(\text{AvgMilesPerStopDriver}/\text{AvgMilesPerStopDailyMaxFleet}) \quad \text{(eq. 8)}$$

The default weights for the entire population of drivers would be as assigned by the system 100 to enable comparisons of Productivity Scores across the driver population. These weights are modifiable by the fleet manager for his vehicles based on the relative importance places on stops and miles. In some embodiments, when the number of jobs for a driver is known, the AvgStopsPerHour will change in this scenario to reflect stops per job or any other similar approach.

C) Overall Driver Score

The overall driver score is a weighted average of the Safety Score, Fuel Economy Score and the Productivity Score. This is given by:

$$\text{Driver Score} = 0.5\times\text{Safety Score} + 0.3\times\text{Productivity Score} + 0.2\ \text{Fuel Economy Score} \quad \text{(eq. 9)}$$

Here too, the weights would be assigned as default weights but could be changed by the fleet manager. This flexibility gives control to the fleet manager (through the Fleet Management System 100) to reward drivers based on the interests of the manager's fleet.

Figure 4:
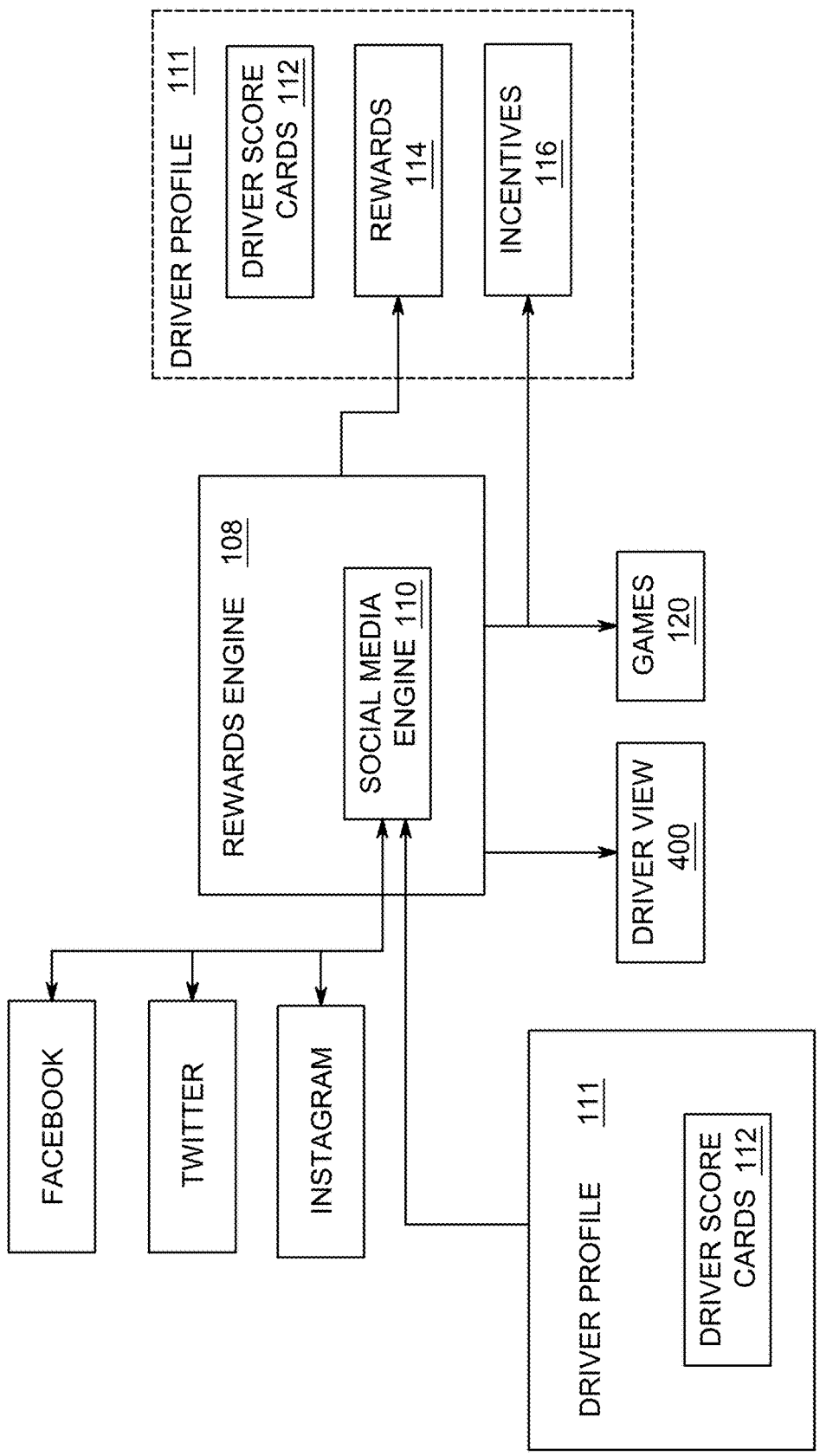
FIG. 4 illustrates a block diagram of the rewards engine in accordance with exemplary embodiments of the present invention.

FIG. 4 illustrates a block diagram of the rewards engine in accordance with exemplary embodiments of the present invention.

The rewards engine 108 receives the rankings 306 and the driver profile 111. Additionally the rewards engine 108 receives driver social information via the social media engine 110. In some embodiments, the driver social information is obtained from their social media accounts on such services as FACEBOOK, TWITTER and INSTAGRAM. Driver social information is used in combination with the driver profile 111 and the rankings 306 to generate rewards 114 and incentives 116 which are stored as part of the driver profile 111. In addition, the rewards engine 108 generates games 120 based on driver specific behavioral targets derived from the Driver Target engine 107 in which drivers can compete to increase their rank in rankings 306 to obtain better rewards. Drivers can participate in these games via their social media profiles or via a driver view 400 on their personal mobile device, further illustrated in FIGS. 10-13.

Figure 5:
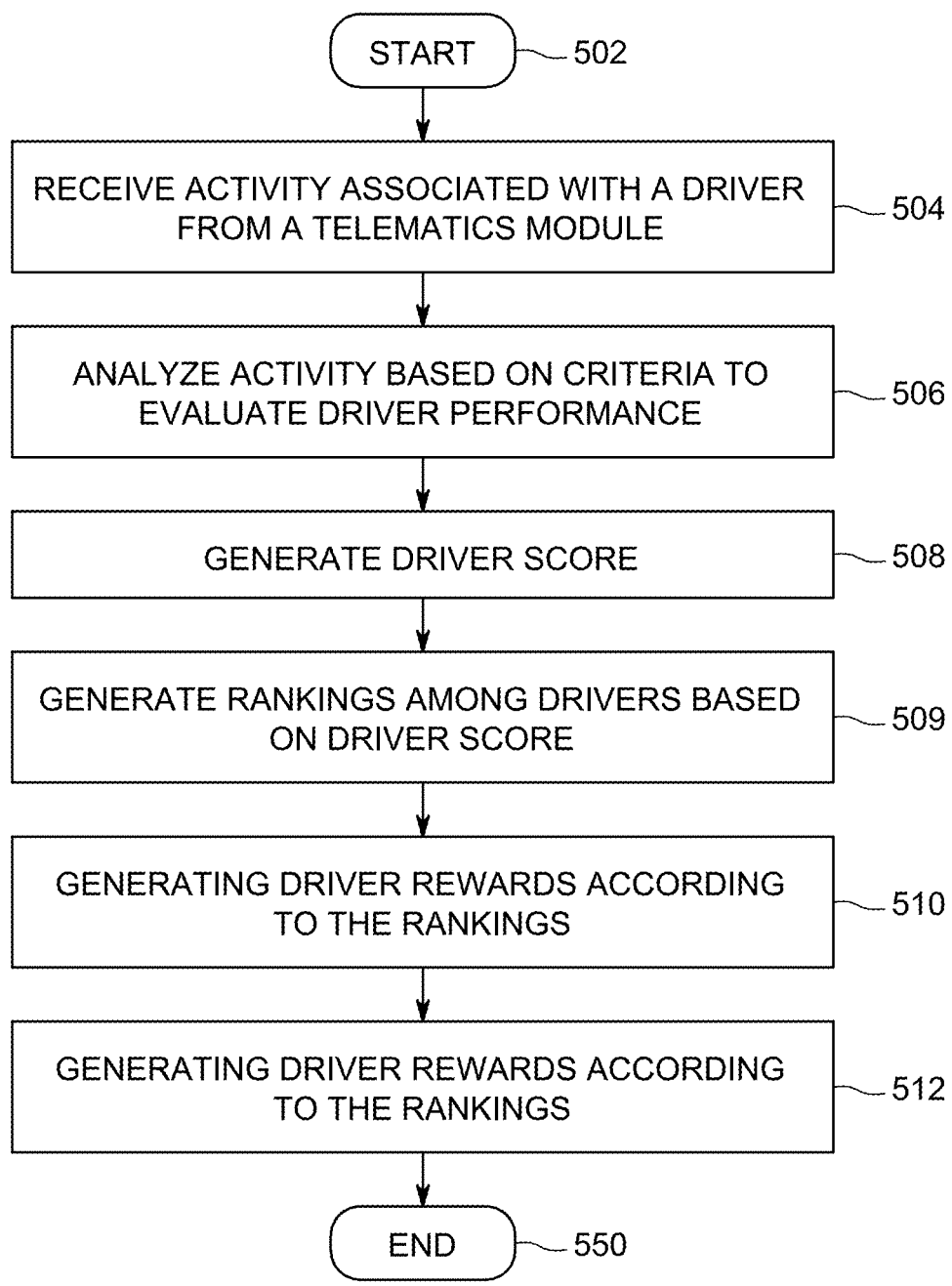
FIG. 5 illustrates a flow diagram for generating a driver profile according to exemplary embodiments of the present invention.

FIG. 5 illustrates a flow diagram for method 500 for generating a driver profile according to exemplary embodiments of the present invention. The method 500 is an exemplary implementation of the fleet management system 100, modules of which are stored in one of memories 150 and executed by one or more of the CPUs 1 to N.

The method begins at step 502 and proceeds to step 504. At step 504, the evaluation engine 302 of the analytics engine 106 shown in FIG. 3 receives activity associated with a driver and vehicle (i.e., driver activity), via the communications engine 104 from a telematics module installed on a vehicle in a fleet of vehicles.

At step 506, the evaluation engine 302 analyzes the driver activity based on a predetermined set of criteria to evaluate driver performance. In some embodiments, the criteria include speeding events, fuel efficiency, average route time, braking events, and the like. The driver activity in each of those categories is compared to the criterion and at step 508, a driver score is generated based on the driver's performance. For a more detailed discussion on the calculation of the driver score and various components of each, see the discussion related to FIGS. 2 and 3, and the sections below entitled "Framework for a daily Driver Score".

At step 509, the ranking engine 304 shown in FIG. 3 aggregates each driver's score (or plurality of scores across several categories) and compares the score to other drivers' scores in the fleet of vehicles to generate rankings of drivers, whether an overall ranking or individual categorical rankings.

At step 510, the rewards engine 108 generates rewards for each driver according to their ranking in the rankings. For example, a driver ranked $1^{st}$ receives a greater reward than a driver ranked $5^{th}$. In some instances, drivers may be ranked highly in one category and lower in another category. In such an instance, the fleet management system 100 may have individualized rewards for each category, the system 100 may have an overall reward for driver performance, or the system 100 may have a combination of both. At step 512, the reward engine 108 further generates incentives for each driver based on driver specific behavioral targets derived from the Driver Target engine 107 to increase their rankings in the next round of driver evaluation. The method terminates at step 514.

Figure 6:
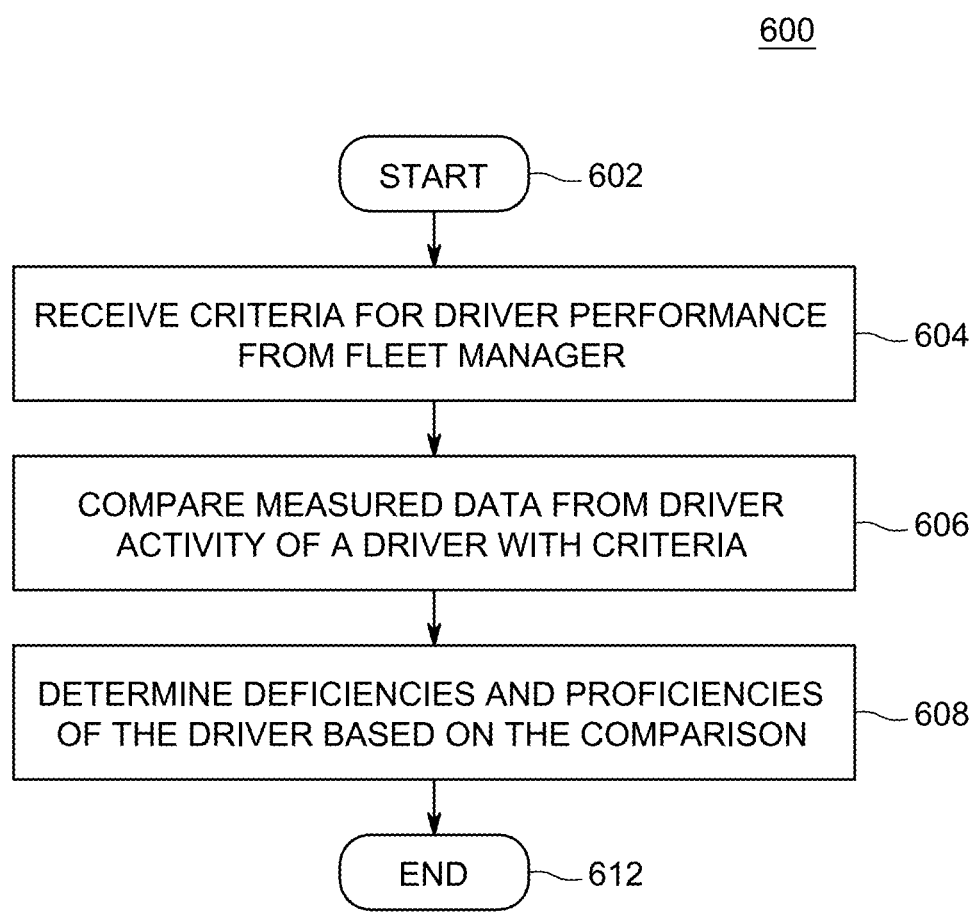
FIG. 6 illustrates a flow diagram of a method for evaluating driver performance in accordance with exemplary embodiments of the present invention.

FIG. 6 illustrates a flow diagram of a method 600 for evaluating driver performance in accordance with exemplary embodiments of the present invention.

The method 600 is an exemplary implementation of the evaluation engine 302, stored in one of memories 150 and executed by one or more of the CPUs 1 to N.

The method begins at step 602 and proceeds to step 604. At step 604, criteria for driver performance is received at the evaluation engine 302. In some embodiments, the criteria is received from the fleet manager 102, or automatically generated based on prior driver score cards generated by the system 100.

At step 606, the driver activity data is compared to the data contained in the criteria. At step 608, the evaluation engine 302 determines deficiencies and proficiencies of the driver based on the comparison. The method terminates at step 612.

Figure 7:
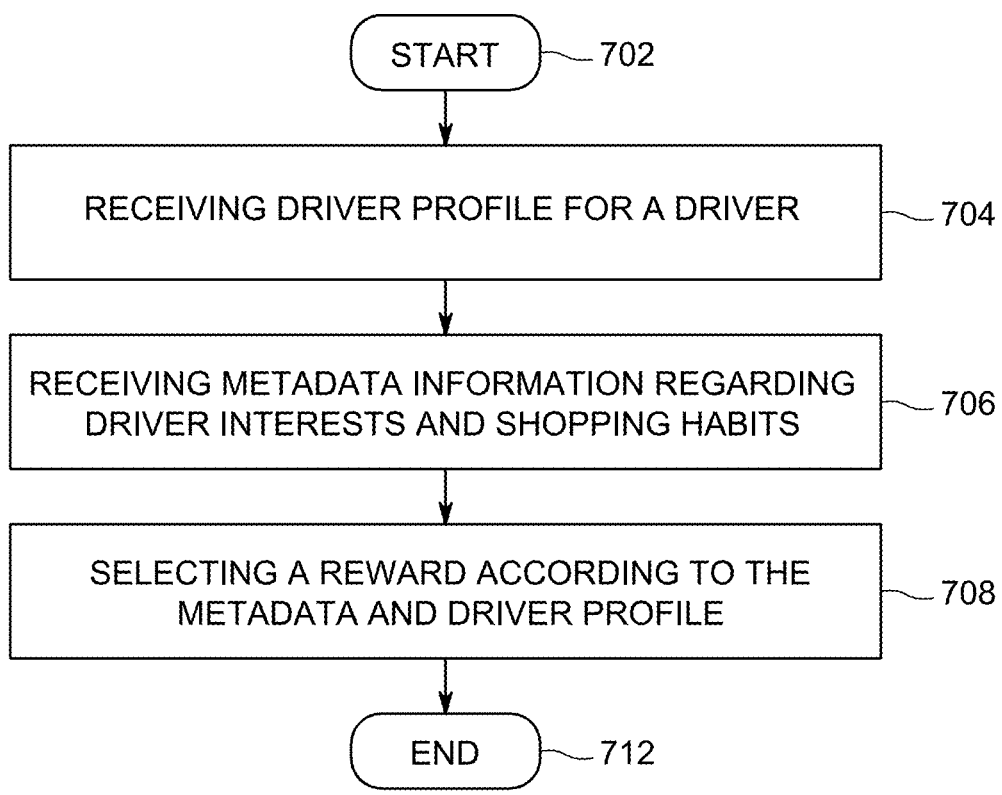
FIG. 7 illustrates a flow diagram of a method for determining rewards for driver performance in accordance with exemplary embodiments of the present invention.

FIG. 7 illustrates a flow diagram of a method 700 for determining rewards for driver performance in accordance with exemplary embodiments of the present invention.

The method 700 is an exemplary implementation of the rewards engine 108, stored in one of memories 150 and executed by one or more of the CPUs 1 to N.

The method begins at step 702 and proceeds to step 704. At step 704, the rewards engine 108 receives driver profiles for each driver in the fleet of vehicles. At step 706, the rewards engine 108 further receives metadata information regarding driver social information such as driver interests, shopping habits, location and the like. At step 708, the rewards engine weights each portion of the driver social information to select rewards and incentives for the driver according to the metadata and driver profile. The method terminates at step 712.

Figure 8:
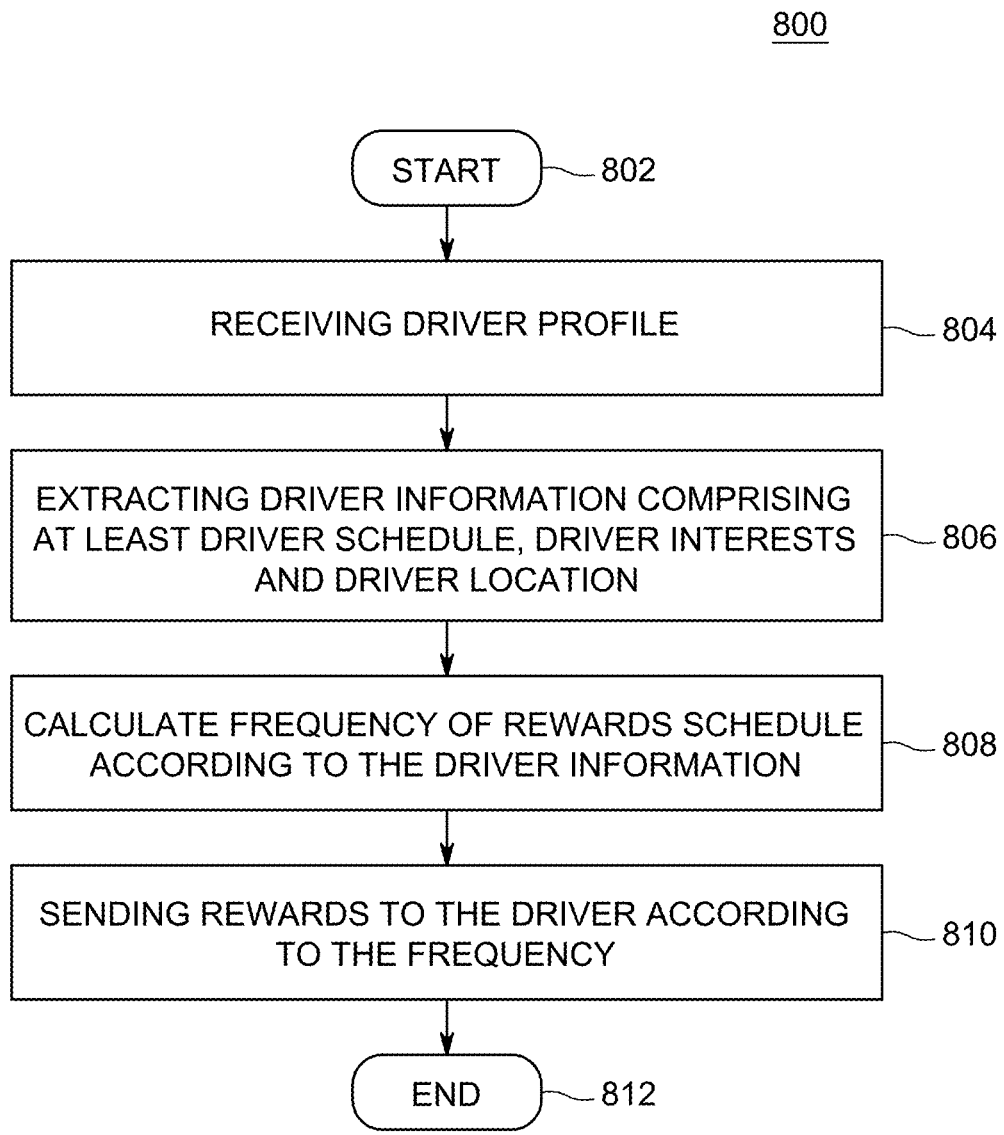
FIG. 8 illustrates a flow diagram of a method for determining frequency of delivering rewards for driver performance in accordance with exemplary embodiments of the present invention.

FIG. 8 illustrates a flow diagram of a method 800 for determining frequency of delivering rewards for driver performance in accordance with exemplary embodiments of the present invention.

The method 800 is an exemplary implementation of another portion of the rewards engine 108, stored in one of memories 150 and executed by one or more of the CPUs 1 to N.

The method begins at step 802 and proceeds to step 804. At step 804, the social media engine 110 receives the driver profile of a driver of a vehicle in the fleet of vehicles. At step 806, driver social information such as work schedule, interests, location, shopping habits and the like, are extracted from the driver's social media accounts.

At step 808, the reward engine 108 calculates a frequency of rewards schedule according to this driver social information. At step 810, rewards due to the driver are sent according to the frequency so as to maximize the drivers investment in improving the performance of their duties. The method terminates at step 812.

Figure 9:
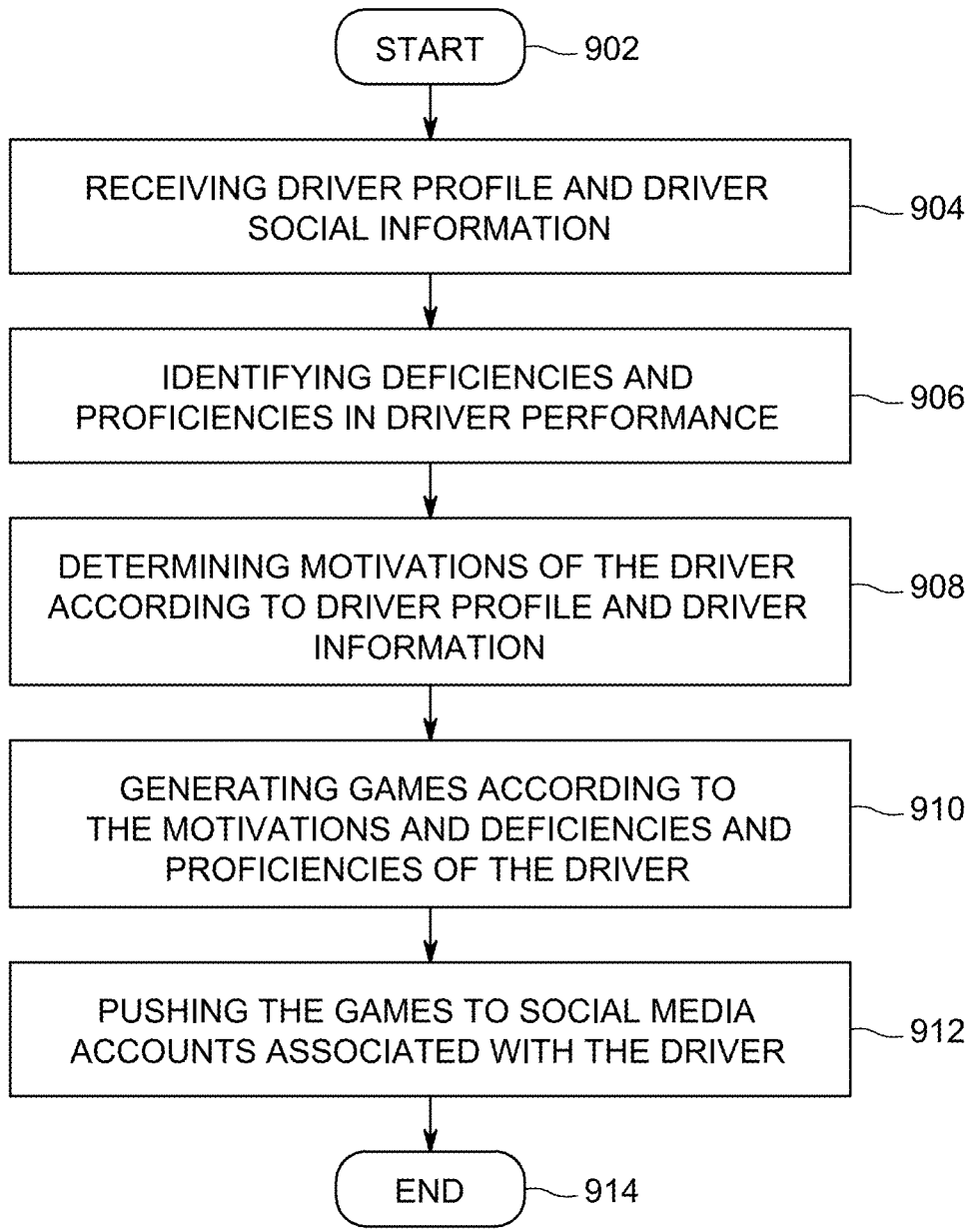
FIG. 9 illustrates a flow diagram for generating games based on driver telematics in accordance with exemplary embodiments of the present invention.

FIG. 9 illustrates a flow diagram of a method 900 for generating games based on driver telematics in accordance with exemplary embodiments of the present invention.

The method 900 is an exemplary implementation of another portion of the rewards engine 108 and the analytics engine 106, stored in one of memories 150 and executed by one or more of the CPUs 1 to N.

The method begins at step 902 and proceeds to step 904. The rewards engine 108 receives the driver profile and driver social information at step 904. At step 906, the analytics engine 106 identifies deficiencies and proficiencies in a driver's performance of their job. At step 908, the rewards engine determines motivations of the driver according to the driver profile and driver social information. Motivations include ways in which a driver may be motivated to improve performance of their job. At step 910, games are generated according to the motivations, deficiencies and proficiencies of the driver. At step 912, these games are pushed to the driver's social media accounts in order to share them with other drivers and encourage driver competition. At step 914, the method terminates.

Figure 10:
FIGS. 10-13 illustrate graphical user interfaces associated with the system of FIG. 1 in accordance with exemplary embodiments of the present invention.
Figure 11:
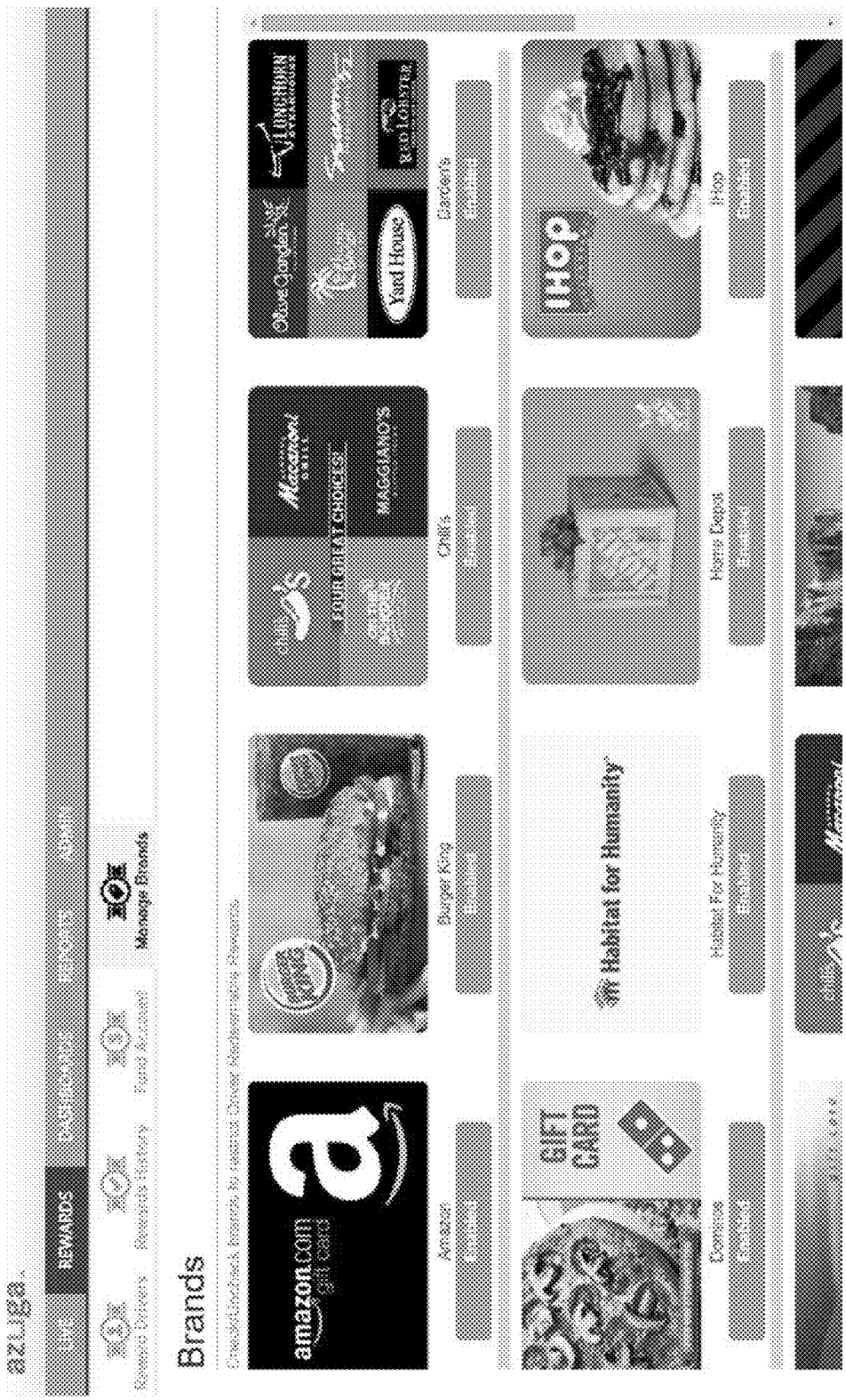

FIG. 10 illustrates an interface available to a fleet manager for viewing scores and rankings of drivers within the system 100 of FIG. 1. Additionally, the fleet manager can navigate from the scores, to rewards history, brands of rewards, a reporting tool and an administrative tool. FIG. 11 illustrates an interface screen where a fleet manager can manage the brands of rewards available to their drivers. The manager can enable and disable different brands and restrict particular users to some brands, while enabling particular brands for other users.

Figure 12:
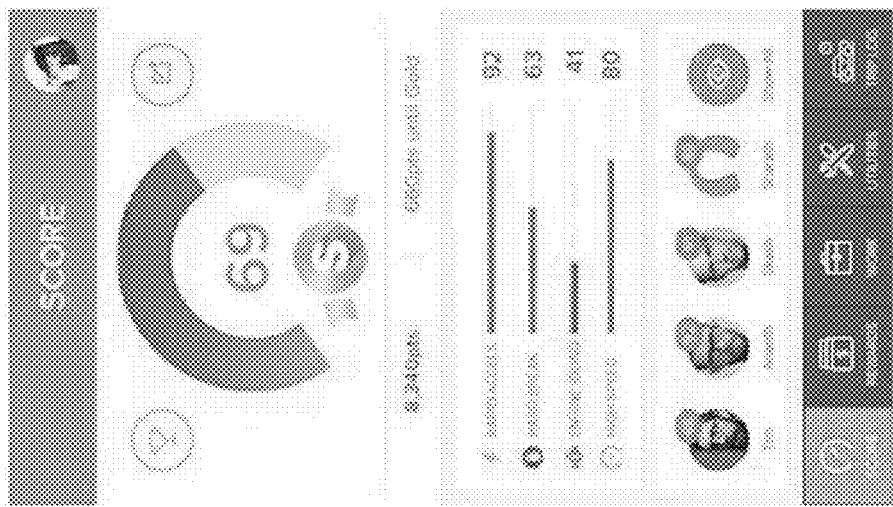
Figure 13:

FIGS. 12-13 illustrates a graphical user interface (GUI) 1200 and 1300 associated with the system of FIG. 1 in accordance with exemplary embodiments of the present invention. FIG. 12 shows an example of a driver view 400 (shown in FIG. 4), displaying the drivers score in a particular category, or an overall driver score. The score may take the form of a point meter which shows how many points are required to receive a particular reward, or until a particular status is given to the driver, e.g., "Gold" status. The driver view may also indicate the contributing factors to the overall score, and the rank of drivers within the driver's fleet, or social network. In some embodiments, the GUI 1200 allows a driver to view their trip log, view their work schedule and view other driver profiles, ultimately acting as a gateway to their fleet information. In one embodiment shown in FIG. 11, the driver can view, activate and/or redeem rewards right from their mobile phone via a GUI 1300. The GUI 1300 may also indicate the date of receiving the reward and the amount of the reward, as well as any other information relevant to the reward.

Figure 14:
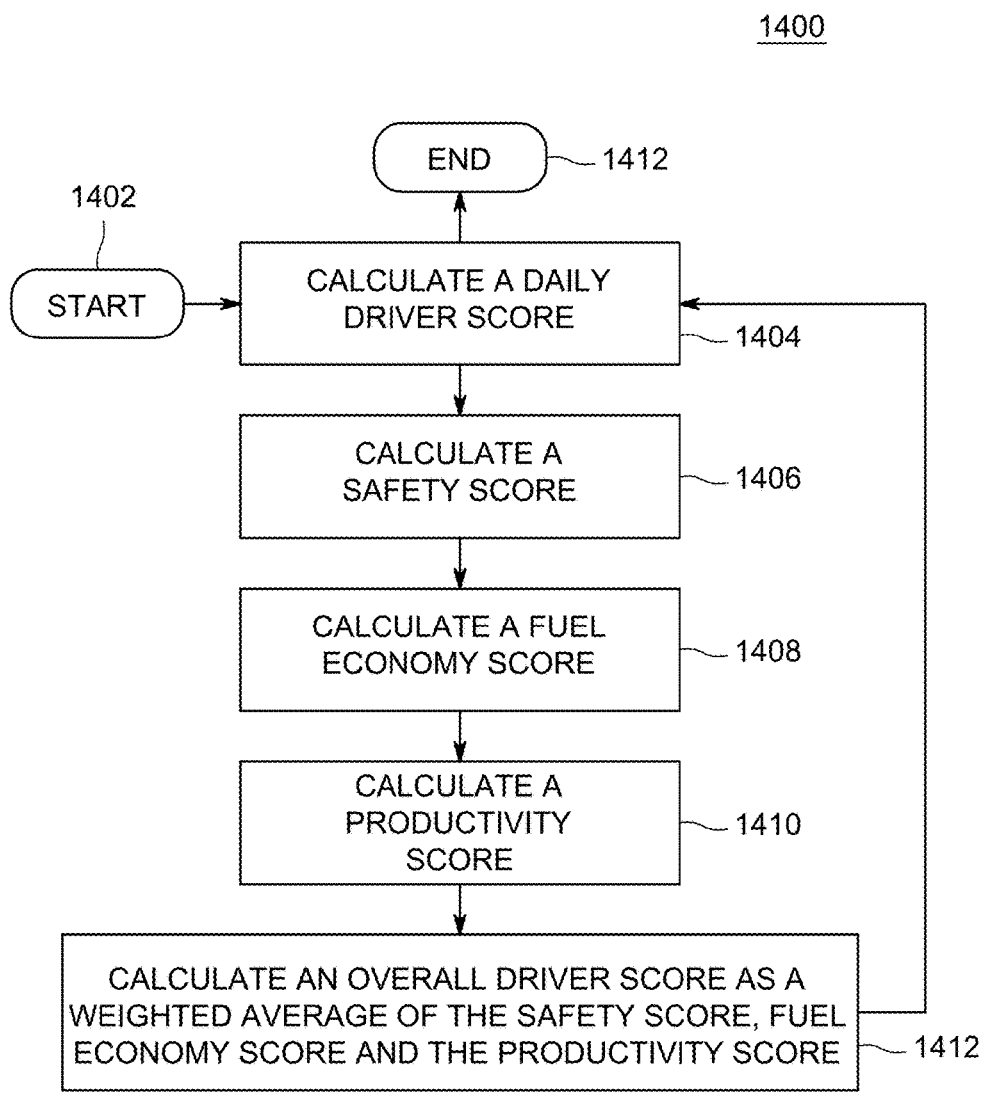
FIG. 14 illustrates a flow diagram for calculating daily driver scores, safety scores, fuel economy scores and productivity scores with exemplary embodiments of the present invention.

FIG. 14 is a flow diagram for a method 1400 according to exemplary embodiments of the present invention. Method 1400 is an exemplary implementation of the processing steps performed by the evaluation engine 302 in FIG. 3, executed by the one or more processors CPU 1 . . . N shown in FIG. 1.

The method begins at step 1402 and proceeds to step 1404, where the daily driver score is calculated. The daily driver score is calculated by proceeding to step 1406 where first, a safety score is calculated. Then, a fuel economy score is calculated at step 1408. At step 1410, a productivity score for the driver is calculated. Finally, an overall driver score is calculated by the evaluation engine 302 as a weighted average of the safety score, the fuel economy score and the productivity score. The method returns to step 1404 and ends at step 1412. The details of the calculation of each individual score and the daily driver score overall are detailed below in the section entitled "Framework for a Daily Driver Score".

While the foregoing is directed to embodiments of the present invention, other and further embodiments of the invention may be devised without departing from the basic scope thereof, and the scope thereof is determined by the claims that follow.

The invention claimed is:

1. A method for evaluating driver performance, the method comprising:
   receiving driver activity associated with a driver of a vehicle in a fleet from a telematics module;
   for each event associated with each driver activity, assigning a score, wherein the score for each event is determined based on a magnitude, duration, and spatio-temporal context of the event;
   generating an aggregate event score for each event for the driver;
   determining a safety score for the driver based on the aggregated event scores;
   determining a fuel economy score for the driver;
   determining a productivity score for the driver;
   determining a composite driver score based on a weighted average of the safety score, the fuel economy score, and the productivity score and updating a driver profile based on the driver activity;
   evaluating the driver score and one or more social media accounts of the driver to generate rewards for the driver and updating the driver profile accordingly;
   comparing measured data from the driver activity with a predetermined criteria for expected driver performance;
   determining deficiencies and proficiencies based on the comparison;
   determining motivations of the driver according to the driver profile and the driver activity;
   generating games according to the motivations, deficiencies and proficiencies of the driver; and
   pushing the games to social media accounts associated with the driver.

2. The method of claim 1, further comprising:
   generating driver specific behavioral targets based on the driver activity; and
   generating incentives that induce drivers to increase a safety score.

3. The method of claim 1, further comprising:
   determining driver scores for all drivers in the fleet;
   generating rankings among drivers of the fleet based on the driver scores; and
   generating the rewards based on the rankings.

4. The method of claim 1, wherein the driver activity comprises at least speed data, route data, rapid acceleration data, mobile device data, hard braking data, fuel use data, cornering data, general drive data and driving conditions.

5. The method of claim 4, wherein the driving conditions comprise at least weather conditions and road surface conditions.

6. The method of claim 1, further comprising:
   generating a driver score card comprising the driver score and reward and incentive information.

7. The method of claim 1, further comprising:
   selecting rewards for each driver based on metadata information regarding driver interests and shopping habits.

8. The method of claim 1, further comprising:
   extracting driver information from the driver profile, the driver information comprising at least a driver schedule, driver interests and driver location;
   calculating a schedule and frequency for granting the rewards to the driver; and
   granting the rewards to the driver according to the schedule and frequency.

9. An apparatus for evaluating driver performance comprising:
   one or more processors; and
   a memory, coupled to the one or more processors, wherein the memory stores thereon computer executable instructions that when executed performs:
      receiving driver activity associated with a driver of a vehicle in a fleet;
      receiving driver activity associated with a driver of a vehicle in a fleet from a telematics module;
      for each event associated with each driver activity, assigning a score, wherein the score for each event is determined based on a magnitude, duration, and spatio-temporal context of the event;
      generating an aggregate event score for each event for the driver;
      determining a safety score for the driver based on the aggregated event scores;
      determining a fuel economy score for the driver;
      determining a productivity score for the driver;
      determining a composite driver score based on a weighted average of the safety score, the fuel economy score, and the productivity score and updating a driver profile based on the driver activity; and
      evaluating the driver score and one or more social media accounts of the driver to generate rewards for the driver and updating the driver profile accordingly;
      comparing measured data from the driver activity with a predetermined criteria for expected driver performance;
      determining deficiencies and proficiencies based on the comparison;
      determining motivations of the driver according to the driver profile and the driver activity;
      generating games according to the motivations, deficiencies and proficiencies of the driver; and pushing the games to social media accounts associated with the driver.

10. The apparatus of claim 9, wherein, when executed, the computer executable instructions further:
generate driver specific behavioral targets based on the driver activity; and generate
incentives that induce drivers to increase a safety score.

11. The apparatus of claim 9, wherein, when executed, the computer executable instructions further:
select rewards for each driver based on metadata information regarding driver interests and shopping habits.

12. The apparatus of claim 9, wherein, when executed, the computer executable instructions further:
extract driver information from the driver profile, the driver information comprising at least a driver schedule, driver interests and driver location;
calculate a schedule and frequency for granting the rewards to the driver; and
grant the rewards to the driver according to the schedule and frequency.

13. A fleet management system comprising:
a plurality of telematics modules each installed in vehicle in a fleet of vehicles, the plurality of telematics modules reporting driver activity to the system; and
one or more computer systems comprising:
one or more processors; and
a memory for storing thereon computer executable instructions that when executed:
receive the driver activity for all drivers in the fleet of vehicles and transmitting fleet information;
for each event associated with each driver activity, assign a score, wherein the score for each event is determined based on a magnitude, duration, and spatio-temporal context of the event;
generate an aggregate event score for each event for each driver;
determine a safety score for each driver based on the aggregated event scores of the driver;
determine a fuel economy score for each driver;
determine a productivity score for each driver;
determine composite driver scores for all drivers based on a weighted average of the safety score, the fuel economy score, and the productivity score of each driver and generate driver profiles based on the driver activity; and
evaluate driver scores to generate rewards for the drivers and updating the driver profiles accordingly;
compare measured data from the driver activity with a predetermined criteria for expected driver performance; and
determine deficiencies and proficiencies based on the comparison;
determine motivations of the drivers according to the driver profile and the driver activity;
generate games according to the motivations, deficiencies and proficiencies of the driver; and
push the games to social media accounts associated with the drivers.

14. The system of claim 13, wherein, when executed, the computer executable instructions further:
generate driver specific behavioral targets based on the driver activity; and generate
incentives that induce drivers to increase a safety score.

15. The system of claim 13, wherein, when executed, the computer executable instructions further:
select rewards for each driver based on metadata information regarding driver interests and shopping habits.

16. The system of claim 13, wherein, when executed, the computer executable instructions further:
extract driver information from the driver profile, the driver information comprising at least a driver schedule, driver interests and driver location;
calculate a schedule and frequency for granting the rewards to the drivers; and
grant the rewards to the drivers according to the schedule and frequency.

17. The system of claim 13, wherein, when executed, the computer executable instructions further:
determine driver scores for all drivers in the fleet of vehicles;
generate rankings among drivers of the fleet of vehicles based on the driver scores; and
generate the rewards based on the rankings.

* * * * *